July 19, 1932.  G. C. WISENOR ET AL  1,867,994
LID FOR COOKING UTENSILS
Filed Aug. 30, 1930
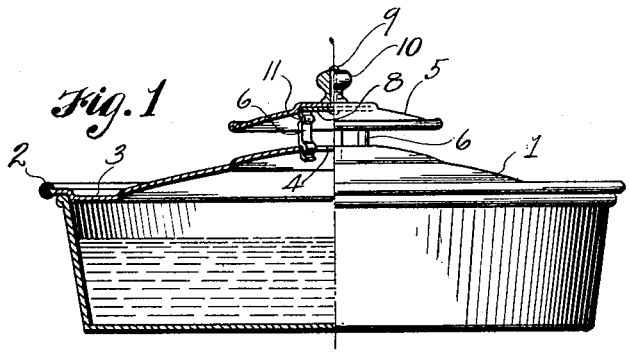
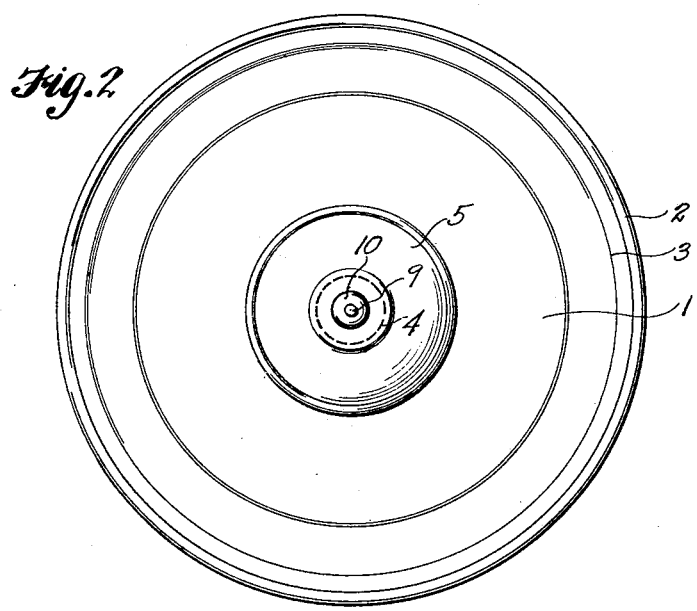
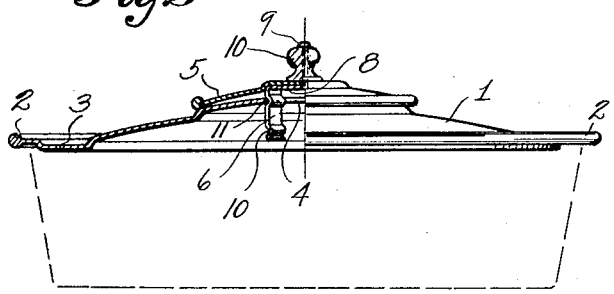
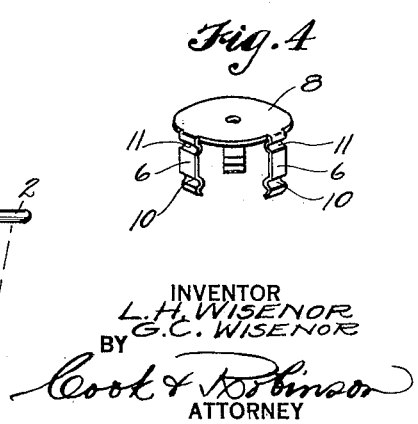
INVENTOR
L. H. WISENOR
G. C. WISENOR
BY
Cook & Robinson
ATTORNEY Patented July 19, 1932

1,867,994

UNITED STATES PATENT OFFICE

GERTRUDE C. WISENOR AND LEMUEL H. WISENOR, OF SEATTLE, WASHINGTON

LID FOR COOKING UTENSILS

Application filed August 30, 1930. Serial No. 479,057.

This invention relates to improvements in lids or closures for cooking utensils such as stew pans, kettles, frying pans, and the like, and the invention is more particularly in the nature of an improvement on closures of that character disclosed in United States patent, Number 1,724,244, issued on August 13, 1929, to L. H. and G. C. Wisenor.

It is the principal object of this invention to provide a closure or lid for cooking utensils, adapted to be applied thereto in the usual manner, but which is provided with a central opening for the escape of steam and gases, and over which opening is a secondary closure so spaced therefrom as to permit of the ready escape of the steam and gases but which will prevent them being thrown or splattered over the lid, stove or articles adjacent to the cooking utensil.

More particularly, the invention embodied in the present invention resides in the specific means for supporting the secondary closure member from the main closure in spaced relation to the opening or adjusted thereagainst.

Other objects reside in the various details of construction and in the combination of parts as will hereinafter be described.

In accomplishing the objects of the invention, we have provided the improved details of construction, the preferred forms of which are illustrated in the accompanying drawing, wherein—

Fig. 1 is a view, showing partly in side elevation and partly in cross section, a closure or lid, embodying the present invention.

Fig. 2 is a top, or plan view of the closure.

Fig. 3 is a view similar to that of Figure 1, showing the secondary closure adjusted against the other to close the opening.

Fig. 4 is a perspective view of a part of the secondary closure, showing the supporting legs.

Referring more in detail to the drawing—

The present device consists of a lid or closure 1 adapted to be applied to a cooking utensil, such as a frying pan, kettle, stew pan or the like, in the usual manner. Preferably it would be of sheet metal and formed with a beaded edge 2 and a countersink, as at 3, for seating within the pan to which it is applied, and it would also be dished upwardly, as illustrated, or in other forms to give stiffness thereto and to provide a sort of dome effect for directing steam, or gases from the substance being cooked, to a central, circular opening 4 formed in the cover.

Overlying the opening 4 of the lid 1 is a secondary closure or lid 5. This is relatively small, but extends substantially beyond the opening, and it is supported in spaced relation above the opening by means of a plurality of yieldable legs 6 which are arranged to enter the opening 4 and to bear outwardly against its edges with holding effect. As illustrated in Fig. 3, the secondary closure is formed with a central, upward depression and a disk 8 of metal is seated thereon and held secure by a rivet 9 which also attaches a knob 10 to the part 5. Formed integral with this disk about its edges and at equally spaced intervals are the legs 6 which are turned downwardly as shown in Fig. 4, and are circularly arranged so as to fit snugly within the opening 4.

In order that the legs will effectively grip the edge opening and permit raising or handling of the main closure through the medium of the secondary one and the knob, the legs 6 are formed near their lower ends with outwardly opening, transverse grooves, as at 10, which receive therein the edge of the cover about the opening 4. The yieldability of the legs permits their being pulled from the opening, or their being pushed farther in, as from the position shown in Fig. 1, to that of Fig. 3, for closing the opening. Notches 11 are also provided in the legs for receiving the pan edge when in this latter position to hold the two parts substantially connected. For either position of adjustment, the holding effect of the yieldable legs is such as to permit of handling the closure by means of the knob 10.

In carrying out this invention, it is recognized that devices of a similar nature have been patented, but in this particular instance the manner of applying the secondary closure is such as to permit of easy and quick adjustment, from open to closed position, or vice versa, or removal of the secondary closure.

It is to be recognized, also that the opening 4 may be varied in size to suit conditions; that the number and length of the supporting legs 6 of the part 5 may be varied as desired, or necessary, and that they may be notched at several points along their lengths so as to make possible a number of different positions to which the secondary closure may be spaced from the opening, and the legs may be attached or applied in different ways without departing from the spirit of the invention, therefore, it is desired that the claims be given an interpretation commensurate with the scope of the invention.

Such devices are very desirable for frying pans, or stew pans, since they retain heat without detriment to the cooked product by reason of steam or moisture being held back.

The present construction is relatively inexpensive, easy to adjust and effective in use. It may be made in various shapes and sizes and of various materials and is not confined in its use to any particular type of pan, kettle or cooking utensil.

Having thus described the invention, what we claim as new therein and desire to secure by Letters-Patent, is:

1. A lid for cooking utensils having a relatively small central, circular opening, and a closure therefor centrally overlying the lid above the opening and substantially larger than the opening, a disk fixed centrally to the closure on its under side, and yieldable legs integral with the disk and projecting into the opening in yieldable holding contact with its edges for adjustably supporting the closure relative to the lid.

2. A lid for cooking utensils having a relatively small central opening and a closure therefor centrally overlying the lid above the opening and substantially larger than the opening, a disk fixed centrally to the closure on its under side, and yieldable legs integral with the disk and projecting downwardly within the opening and having notched surfaces in yieldable holding contact with the edges of the opening for adjustably supporting the closure and a nob for the closure having an attaching portion extended through the cover and disk and functionally retaining the disk in place.

Signed at Seattle, Washington this 16th day of August, 1930.

GERTRUDE C. WISENOR.
LEMUEL H. WISENOR.